S. E. SELLECK.
HANDLE FOR BAKERS' PEELS.
APPLICATION FILED FEB. 10, 1910.
964,817.
Patented July 19, 1910.
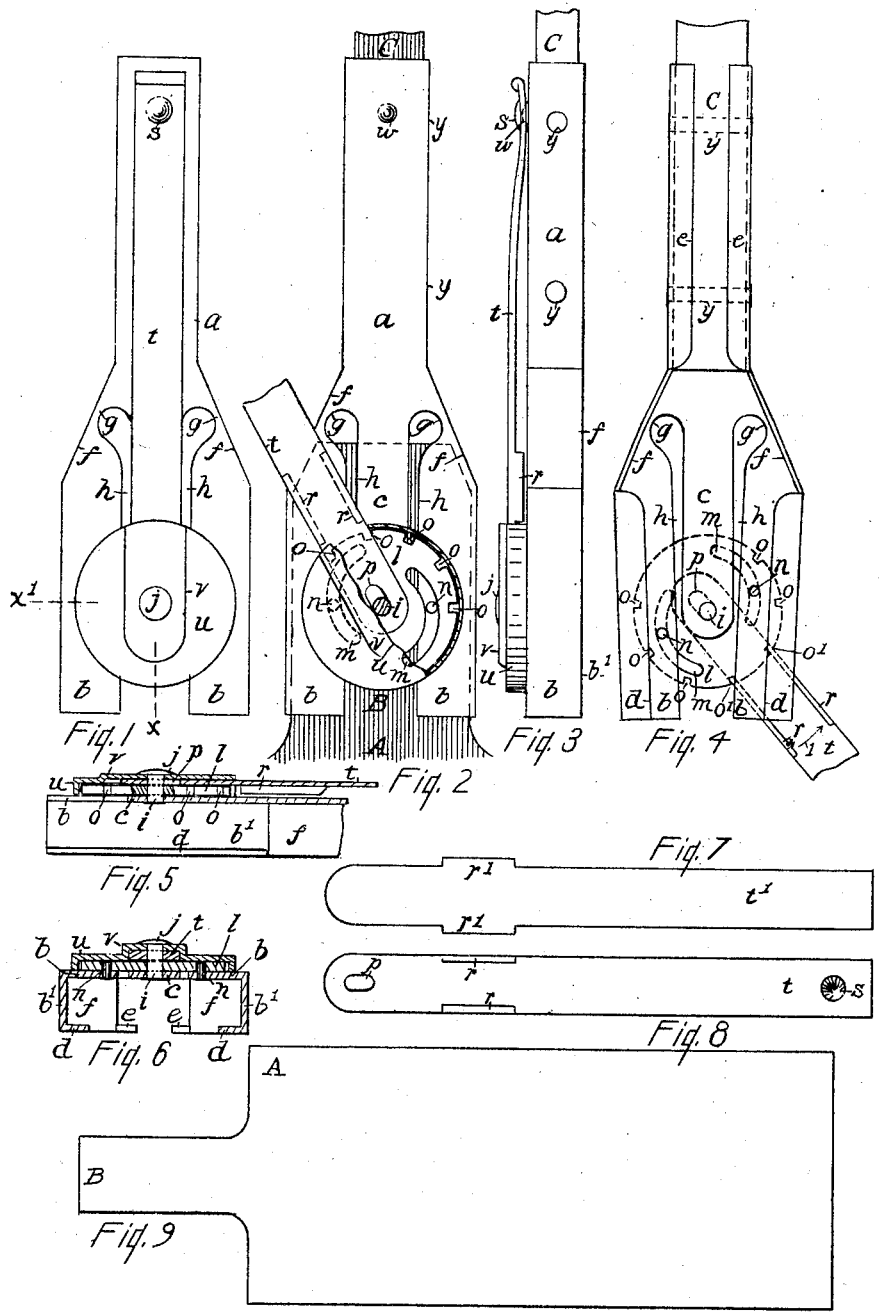

UNITED STATES PATENT OFFICE.

SILAS E. SELLECK, OF COLD SPRING, NEW YORK.

HANDLE FOR BAKERS' PEELS.

964,817. Specification of Letters Patent. Patented July 19, 1910.

Application filed February 10, 1910. Serial No. 543,107.

*To all whom it may concern:*

Be it known that I, SILAS E. SELLECK, a citizen of the United States, and resident of Cold Spring, in the county of Putnam and State of New York, have invented certain new and useful Improvements in Handles for Bakers' Peels, of which the following is a specification.

This invention relates to bakers' implements for handling their products in ovens, and has for its object a removable handle for the implement known as a peel, with the peel itself made adaptable to the handle. The objects are attained by the means set forth in this specification and the accompanying drawings.

Referring to the drawings, in which like letters refer to similar parts throughout the several views, Figure 1 is a plan and a top view of the handle. Fig. 2 represents the handle with the peel attached thereto. Fig. 3 is an edge elevation of the handle. Fig. 4 is a view of the under side of the handle disclosing how it is to be operated. Fig. 5 is a longitudinal section of a part of the handle through the line $x$ Fig. 1. Fig. 6 is a transverse section through the line $x^1$ of Fig. 1. Figs. 7 and 8 are details relating to the operating lever of the handle. Fig. 9 is a plan of the peel.

The handle is made preferably of sheet metal as shown, one end of it to form a rectangular socket $a$, Figs. 1 2 3 4, comprising a top, sides, and flanges $e\ e$, Fig. 4. The socket $a$ is adapted for a wooden handle $c$, secured in place by rivets $y\ y$, Figs. 2, 3, 4.

Beyond the socket the handle tapers to a breadth that admits of a division into three prongs $c\ b\ b$, Figs. 1 2 4, the divisions being made by perforations $g\ g$ and slots $h\ h$. The clamping prongs $b\ b$ are bent rectangularly as in Fig. 6, having sides $b^1\ b^1$ and inwardly extending flanges $d\ d$, Figs. 4 5 6, which together constitute a rectangular flexible socket, as in Fig. 6, to receive the shank of the peel as in Fig. 2. The middle tapering portion of the handle has side flanges $f\ f$, Figs. 3, 4, 6, and by reason of the perforations $g$ the prongs $b$ are more or less flexible at the points of the perforations.

The tongue $c$, made shorter than the side prongs is provided with a pivot $i$ and a disk $l$, Figs. 2, 4, 5, 6, is supported on the pivot. The disk is provided with cam slots $m\ m$, and studs $n\ n$ secured in the prongs $b$ project within the slots, so that turning the disk will cause an opening and closing of the prongs, depending upon which way the disk is turned. Fig. 4 shows the prongs drawn toward each other. With nothing between the prongs they will be drawn together most at the points as shown, but when a peel shank is between them the flexibility at the perforations $g$ will admit of the prongs moving in parallel lines, within reasonable limits.

To operate the cam $l$ a lever $t$ is provided. The lever turns upon the pivot $i$, and the lever bearing $p$ is slotted to admit of some longitudinal movement of the lever, so that it is slidable upon its pivotal bearing.

The lever is provided with side flanges $r\ r$, Figs. 2 3 4 5, and the cam disk has notches $o$ upon its periphery spaced to conform to the distance between the flanges on the lever, and the inner ends of the flanges are adapted as teeth to engage with the notches in the disk. When the lever is pulled outward, as in Fig. 2, the teeth are free from the disk. Pushing the lever toward the pivot $i$ causes the teeth to engage with the notches $o$, as in Fig. 4, at $o^1\ o^1$. Therefore the operator can use the lever at the part of the cam disk that is most convenient to him, and when he has tightened the handle on the peel, the lever is released and carried to its normal place on top of the handle as in Figs. 1 and 3. In order to have the handle retained in that position the lever is provided with a boss $s$, Figs. 1 3, that presents a depression or recess on its under side, as in Fig. 8, and this recess engages with an elevated point $w$, Figs. 2 3, on the handle.

Figs. 7, 8 illustrate the formation of the lever $t$ with its flanges $r$. In Fig. 7 $t^1$ represents a blank with side extensions $r^1\ r^1$. The extensions are bent over to form flanges $r$ as shown in Fig. 8.

The part $u$, Figs. 1, 2, 5, 6 is a cup with a depression $v$ in its solid side that fits over the lever $t$. The cup is made to cover the end of the lever and the cam disk. It moves always with the lever, being retained in place by the enlarged pivot head $j$. It serves to conceal and protect the cam disk. Fig. 4 is shown without the cup, and Fig. 2 shows the cup partly cut away.

Fig. 2 illustrates how the handle is used. The lever has drawn the cam tightly, closing the prongs $b\ b$ on the shank B of the peel A, and has been withdrawn from engagement with the disk, and is ready to be placed in the position shown in Figs. 1 and 3.

Peels are made with a shank shaped as shown, except they are slotted to receive a handle. This peel is made with a solid shank B, Fig. 9, for adaptation to the adjustable handle.

While this handle is shown as made entirely of sheet metal, it is plain that it is susceptible of variations from the forms shown, and of being made of cast metal, without departing from the spirit of the invention, and the right is claimed to such modifications.

Having described my invention, what I claim and desire to secure by Letters Patent, is—

1. A handle for a baker's peel comprising a socket for a wooden handle, flexible flanged prongs constituting a socket for the shank of a peel, a fixed point between the prongs for the support of a cam disk, a cam disk pivoted on said fixed point, cam slots and notches in the cam disk, studs in the prongs engaging with the cam slots in the disk, and a lever having a longitudinal movement on the disk pivot provided with teeth to engage with the notches in the disk, and means to secure the lever in a normal place on the handle.

2. The combination with a baker's peel having a solid shank, of a removable handle comprising a socket for a wooden handle, flexible flanged prongs constituting a socket for the shank of a baker's peel, a fixed point between the prongs for the support of a cam disk, a cam disk pivoted on said fixed point, cam slots and notches in said disk, studs in the prongs to engage with the cam slots in the disk, a lever to operate the cam disk slidable on the disk pivot, teeth on the lever to engage with the notches in the disk, a cup covering the cam disk and part of the lever and revoluble with the lever, and means for holding the lever to the handle.

3. In a removable handle for a baker's peel having flexible clamping prongs for holding the peel, a fixed point between the prongs, a cam disk pivoted on said fixed point, cam slots and notches in said disk, studs in the prongs projecting within the cam slots, a slidable lever engaging with the cam disk pivot, and teeth on the lever to engage with the notches in the cam disk.

4. In a removable handle for a baker's peel having flexible prongs to constitute a socket for the shank of a peel, a fixed point between the prongs for a cam disk, a cam disk on said fixed point, cam slots in the cam disk, studs on the flexible prongs to engage with the cam slots, and means for turning the disk to open and close the prongs.

Signed at Cold Spring in the county of Putnam and State of New York this 4th day of February A. D. 1910.

SILAS E. SELLECK.

Witnesses:
F. K. AMERMAN,
JAMES G. LADUE,
WILLIAM H. TRUESDELL.